United States Patent [19]

Feiten et al.

[11] Patent Number: 5,537,017

[45] Date of Patent: Jul. 16, 1996

[54] SELF-PROPELLED DEVICE AND PROCESS FOR EXPLORING AN AREA WITH THE DEVICE

[75] Inventors: Wendelin Feiten, Neubiberg; Marcus Moller; Werner Neubauer, both of Müchen, all of Germany

[73] Assignee: Siemens Aktiengesellschaft, Munich, Germany

[21] Appl. No.: 338,608

[22] PCT Filed: May 3, 1993

[86] PCT No.: PCT/DE93/00385

§ 371 Date: Nov. 21, 1994

§ 102(e) Date: Nov. 21, 1994

[87] PCT Pub. No.: WO93/24874

PCT Pub. Date: Dec. 9, 1993

[30] Foreign Application Priority Data

May 22, 1992 [DE] Germany ............... 42 17 093.1

[51] Int. Cl.⁶ .................................................. G06F 15/50
[52] U.S. Cl. ............... 318/587; 318/568.12; 318/568.16; 364/424.02; 364/516
[58] Field of Search ............... 364/424.02, 516; 318/568.16, 587, 568.12; 250/379, 253

[56] References Cited

U.S. PATENT DOCUMENTS

| | | | |
|---|---|---|---|
| 4,962,453 | 10/1990 | Pong et al. | 364/424.02 |
| 5,006,988 | 4/1991 | Borenstein et al. | 318/568.16 |
| 5,204,814 | 4/1993 | Noonan et al. | 364/424.02 |
| 5,276,618 | 1/1994 | Everett, Jr. | 364/516 |
| 5,321,614 | 6/1994 | Ashworth | 364/424.02 |
| 5,324,948 | 6/1994 | Dudar et al. | 250/379 |

OTHER PUBLICATIONS

Wiklund, U., Anderson, U., Hyyppa, K., Gelders, L. F., "AGV navigation by angle measurements", Automated Guided Vehicle Systems. Proceedings of the 6th International Conference, AGVS-6, Brussels, Belgium 25–26 Oct. 1988, pp. 199–212, Kempston, UK IFS Publications 1854230247.

Fahringer, B. J., "AGVs and automation: getting there", Production (USA) vol. 101, No. 7, pp. 35–39, Jul. 1989.

Hill, L., "Improvements in inductive communications for wire–guided AGVs", Automated Guided Vehicle Systems. Proceedings of the 7th International Conference. Technology for Tomorrow, Berlin, West Germany 13–14 Jun. 1989, p. 69–81 vi + 160 1989, Bedford, UK IFS 1854230484.

Robins, M. P., "Free–ranging automatic guided vehicle System", GEC Rev. (GB), vol. 2, No. 2, pp. 129–132, 1986.

*Primary Examiner*—John W. Cabeca
*Attorney, Agent, or Firm*—Hill, Steadman & Simpson

[57] ABSTRACT

The device and process is utilized for exploring an unknown working area. It is not necessary for this purpose to apply any markings in the area before using the device and the area does not have to have any special characteristics for determining location. The described device takes markings with it, for example small metal plates or a power supply cable which it lays out while it moves along a boundary of the area. It then turns around and moves back along the marking, laying out new markings. On encountering the next wall of the area it turns, picks up the previously laid-out markings and again lays new markings. This operation continues until the entire area has been covered. An example of the use of the device could be an industrial vacuum cleaner for cleaning carpet floors.

12 Claims, 2 Drawing Sheets

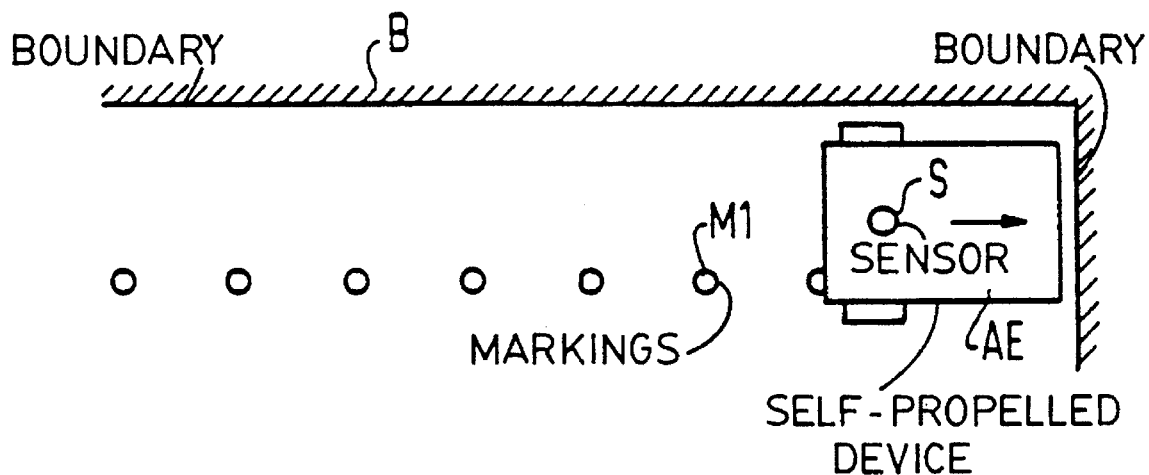
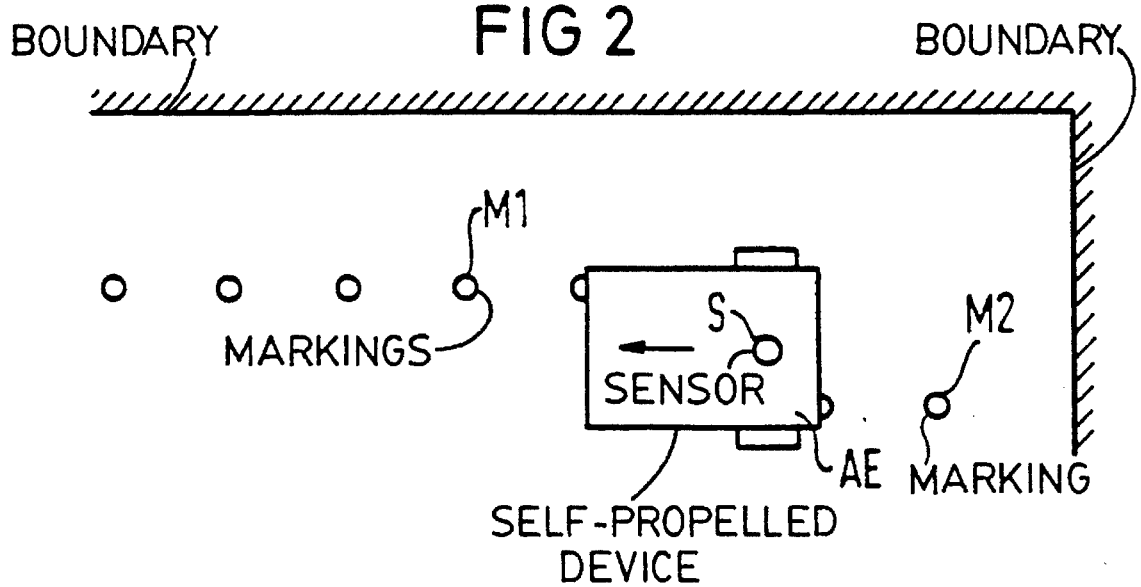

SELF-PROPELLED DEVICE AND PROCESS FOR EXPLORING AN AREA WITH THE DEVICE

BACKGROUND OF THE INVENTION

Nowadays there is a wide range of possible applications for autonomously operating mobile units. Just think in this respect of remote sensing probes, mobile units which operate in hazardous areas, self-propelled industrial vacuum cleaners, transporting vehicles in the production industry etc. To ensure that these autonomously operating self-propelled units have greatest possible freedom of movement and are flexible in use, it is often desirable and appropriate for these units first of all to mark and explore their working area. Until now, processes in which the working area is marked in advance have often been used (bar codes for laser triangulation, Wiklund, U., Anderson, U., Hyyppa, K., Gelders, L. F., "AGV navigation by angle measurements" Automated Guided Vehicle Systems, Proceedings of the 6th International Conference, AGVS-6, Brussels, Belgium 25–26 Oct. 1988, p. 199–212, Kempston, UK IFS Publications 1854230247; transponders, Hill, L., "Improvements in inductive communications for wire-guided AGVs", Automated Guided Vehicle Systems, Proceedings of the 7th International Conference, Technology for Tomorrow, Berlin, West Germany 13–14 Jun. 1989, p. 69–81 vi+160 1989, Bedford, UK IFS 1854230484; guide lines, Fahringer, B. J., "AGVs and automation: getting there", Production (USA) Vol 101, No 7, p 35–39, Jul. 1989, so that mobile systems can take their bearings from these marks. These processes all have the disadvantage that they are complicated and that they restrict the flexibility of use of the system.

A further known possibility is the use of complex sensory technology, by which landmarks present in the working area are extracted and serve as an orientation aid for the self-propelled autonomous system, Robins, M. P., "Free-ranging automatic guided vehicle System", GEC Rev. (GB), Vol 2, No 2, p. 129–132, 1986. In this case, the disadvantage is the very complex sensory technology and the necessity for the presence of landmarks in the vicinity of use. Further possibilities for exploring working areas and their marking are not known.

SUMMARY OF THE INVENTION

The object on which the invention is based is to specify a movable device and a process for exploring and mapping an area, with which the area does not have to have any special characteristics specifically for exploring.

This object is achieved for the device and for the process of the present invention as follows.

In general terms the present invention is a self-propelled device for exploring an area. The device has at least one sensor, which detects obstacles in the area, means for marking the area and means for detecting the marking means. The device has a memory for storing the geometry of the area.

The present invention is also a process for exploring an area, in which in a first step, a boundary of the area is established. In a further step, a self-propelled device moves up to the boundary of the area. In a further step, the device moves along the boundary and when doing so applies markings along the path at a distance from the boundary. In a further step, the device turns around when it encounters a further boundary of the area and moves, taking its bearings from the previously applied markings, and applies further markings at a distance from the previously applied markings. These last two steps are repeated until the entire area has been explored. The result of the exploring is recorded for further evaluation.

All other further developments of the present invention are as follows.

The device has a sensor that detects the area boundary. The means for marking are small metal plates, a power cable of the device, or odoriferous substances or other substances. The device removes the marking after use. The means for detecting the marking means is the sensor. The sensor is an ultrasonic sensor or a camera.

An advantage of the present invention is that it can mark areas independently.

It is particularly favorable when exploring and marking areas to begin with the boundary of the area.

It is furthermore advantageous that the device according to the present invention independently detects obstacles by a sensor.

A special advantage of the invented device is that of using marking means which the device contains in any case, for example of taking a power cable or removable marking means with it, such as small metal plates, and using these as a marking, since an unnecessary number of marking means do not have to be taken along.

It is favorable in the invented device to use the sensor also for detecting the marking means, since in this way only one sensor has to be taken along.

The use of an ultrasonic sensor is particularly advantageous in the case of the device according to the present invention. This makes it possible to dispense with lighting and there are sufficient known processes which are based on ultrasonic orientation.

A further favorable sensor for the present invention is a camera, since this allows marking means and obstacles to be detected easily.

The device according to the invention is used particularly favorably in a process in which first of all a boundary of the area is established by the sensor, then the device moves along this area boundary and thereby applies markings and then, after encountering a further boundary of the area, turns round and moves back along the previously applied markings, this operation being repeated until the entire area has been covered. In this way it is ensured that the entire area is explored and marked by the device in an optimum way.

It may also be advantageous to use the device and the exploring process according to the invention for mapping the area or recording its geometry, since no further exploring will be required for future uses.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a device according to the invention when applying the marking and when carrying out the process.

FIG. 2 shows the device according to the invention when picking up the markings and at the same time applying new markings.

DESCRIPTION OF THE PREFERRED EMBODIMENT

Figure 3:
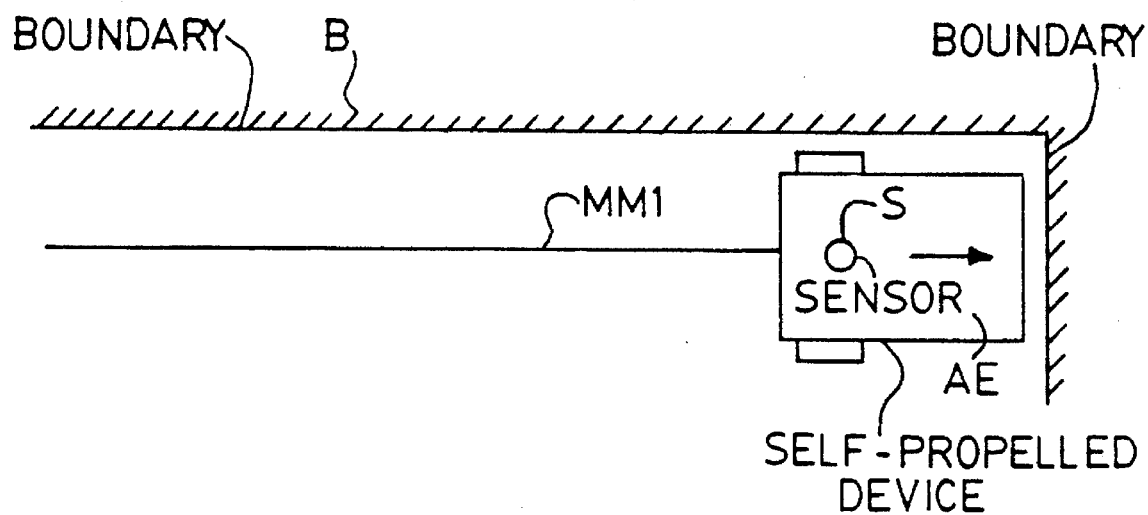
FIG. 3 shows an alternative embodiment of the present invention using a power cable for marking a path.
Figure 4:
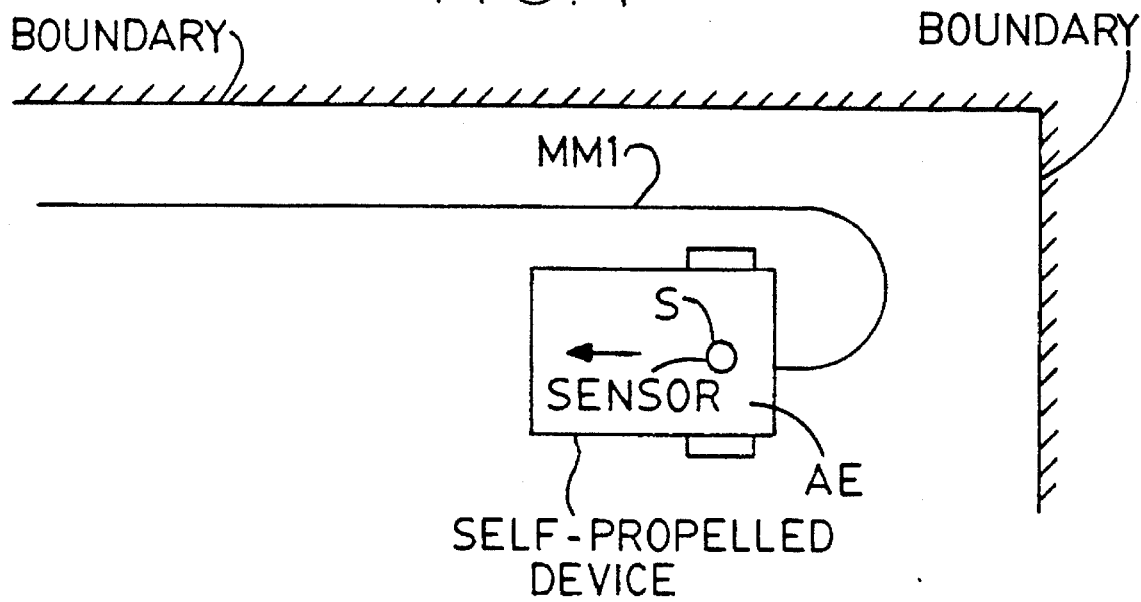
FIG. 4 is another view of the alternative embodiment of FIG. 3.

In FIG. 1, a self-propelled device AE is shown, which moves in an area to be explored. Area boundary B is shown, and markings M1 can be seen. The self-propelled device has a sensor, which enables it to detect the area boundary and the markings M1. When exploring the unknown area, the following occurs:

The self-propelled device AE detects by its sensor S the area boundary B. It moves in the direction of the area boundary B and then runs parallel to the area boundary in the direction of movement indicated by the direction of the arrow. When doing so, it applies at regular intervals markings M1, which are at a distance from the area boundary, as shown in the figure. The markings M1 applied here may be, for example, small metal plates. It is also conceivable, however, that the self-propelled device lays out the power cable MM1 (see FIGS. 3 and 4) during its movement and uses this as a marking. Further possibilities of marking are odoriferous markings or chemical markings.

While the self-propelled device is moving along and applying markings, it can also at the same time perform a function. This function may be, for example, a vacuum cleaning operation. It is also conceivable, however, that, for example, surface areas are provided with paint or that the device applies or collects other substances or carries out similar activities.

The self-propelled device continues to travel in the direction of movement represented by the arrow until it encounters a further area boundary B. Until then it also continues to carry out its marking activity. When it arrives at the area boundary, the self-propelled device AE turns. Everything which follows is then shown in FIG. 2.

FIG. 2 shows the self-propelled device AE, which is moving along markings M1. This self-propelled device AE has a sensor S, by which it detects markings M1 which it has laid out before. This sensor enables the device to move along the markings.

While the self-propelled device is moving along the markings M1, it picks them up again, for example, and lays them out again along a path approximately the width of the device as markings M2. The markings M1 may well be identical to the markings M2. Here it is intended only to show that they are then at a different location when they are laid out by the device AE. During its moving operation, the device can perform an activity, as also already described in FIG. 1. The movement of the self-propelled device AE in the direction of the arrow continues until it again encounters a boundary of the area to be explored. Subsequently, the device turns and moves with the aid of the sensor along the previously laid-out markings M2 in the opposite direction through the area to be explored. The procedure is in this case analogous to that described above. The device can then again lay out new markings, while it picks up the markings M2.

This moving and marking operation continues until the entire area has been covered. By this process according to the invention and the invented device it is ensured that an exact determination of the position of the device is permitted and that an optimum overlap of the paths of movement can be ensured.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

We claim:

1. A process for exploring an area, comprising the steps of:
   a) in a first step, providing a self-propelled device and establishing a boundary of the area;
   b) in a further step, moving the self-propelled device up to the boundary of the area;
   c) in a further step, moving the device along the boundary and when doing so applying markings along a path at a distance from the boundary;
   d) in a further step, turning around the device when the device encounters a further boundary of the area, the device taking bearings from the previously applied markings, and applying further markings at a distance from the previously applied markings;
   e) carrying out the steps c) and d) until an entire area of the area has been explored; and
   f) recording a result of the exploring for further evaluation.

2. The method as claimed in claim 1, wherein the markings are small metal plates.

3. The method as claimed in claim 1, wherein the markings are odoriferous substances.

4. The method as claimed in claim 1, wherein the method further comprises removing the markings after use of the markings.

5. The method as claimed in claim 1, wherein the method further comprises providing a sensor on the device, and using the sensor to detect the previously applied markings.

6. The method as claimed in claim 5, wherein the sensor is an ultrasonic sensor.

7. The method as claimed in claim 5, wherein the sensor is a camera.

8. A process for exploring an area, comprising the steps of:
   a) in a first step, providing a self-propelled device and establishing a boundary of the area;
   b) in a further step, moving the self-propelled device up to the boundary of the area;
   c) in a further step, moving the device along the boundary and when doing so laying a cable along a path at a distance from the boundary;
   d) in a further step, turning around the device when the device encounters a further boundary of the area, the device taking bearings from the previously laid cable, and laying further cable at a distance from the previously laid cable;
   e) carrying out the steps c) and d) until an entire area of the area has been explored; and
   f) recording a result of the exploring for further evaluation.

9. The process as claimed in claim 8, wherein the process further comprises removing the cable after use of the cable.

10. The process as claimed in claim 8, wherein the process further comprises providing a sensor on the device, and using the sensor to detect the previously laid cable.

11. The process as claimed in claim 10, wherein the sensor is an ultrasonic sensor.

12. The process as claimed in claim 10, wherein the sensor is a camera.

* * * * *